(12) United States Patent
Forati

(10) Patent No.: US 10,788,728 B2
(45) Date of Patent: Sep. 29, 2020

(54) LIGHT BEAM STEERING USING ELECTRO-OPTICAL AND CONDUCTIVE MATERIALS

(71) Applicant: TDK Corporation, Tokyo (JP)

(72) Inventor: Ebrahim Forati, San Jose, CA (US)

(73) Assignee: TDK Corporation, Tokyo (JP)

( * ) Notice: Subject to any disclaimer, the term of this patent is extended or adjusted under 35 U.S.C. 154(b) by 196 days.

(21) Appl. No.: 15/986,659

(22) Filed: May 22, 2018

(65) Prior Publication Data

US 2019/0361316 A1 Nov. 28, 2019

(51) Int. Cl.
*G02F 1/29* (2006.01)
(52) U.S. Cl.
CPC .......... *G02F 1/29* (2013.01); *G02F 2001/291* (2013.01); *G02F 2201/12* (2013.01)
(58) Field of Classification Search
CPC ........ G02F 1/292; G02F 1/29; G02F 2203/24; G02F 1/13; G02F 1/133526; G02F 1/13471; G02F 2001/13324; G02F 2201/305; G02F 1/295; G02F 1/1392; G02F 1/2955; G02F 1/025; G02F 1/293; G02F 1/3137; G02F 2001/0154; G02F 2001/213; G02F 2001/291; G02F 2201/12; G02F 2203/05; G02F 2203/12; G02F 1/03; G02F 1/0333; G02F 1/035; G02F 1/3558; G02F 2201/06; G02F 2202/20; G02B 26/0883; G02B 3/08; G02B 5/06; G02B 6/32; G02B 6/351; G02B 6/3556; G02B 26/10; G02B 26/101; G02B 26/103; G02B 27/1006; G02B 27/1073; G02B 27/30; G02B 2006/12107; G02B 2006/12183; G02B 27/0087
USPC ........ 359/237, 242, 265–267, 273, 315, 322
See application file for complete search history.

(56) References Cited

U.S. PATENT DOCUMENTS

2017/0146624 A1* 5/2017 Paul .................... G01R 33/4835

* cited by examiner

*Primary Examiner* — Brandi N Thomas
(74) *Attorney, Agent, or Firm* — Hamilton, Brook, Smith & Reynolds, P.C.

(57) ABSTRACT

In accordance with an embodiment of the present disclosure, there is provided a compact method for beam steering using a layer of transparent, electro-optical material sandwiched between two layers of conductive transparent material, which provides a voltage-controlled light beam steering system without any moving parts.

5 Claims, 3 Drawing Sheets

LIGHT BEAM STEERING USING ELECTRO-OPTICAL AND CONDUCTIVE MATERIALS

BACKGROUND

Light beam steering is a challenge in the design of many sensing, imaging and projection devices, and in other optical devices. Beam steerers have commercial applications in fields including projection displays, laser printers and lidar sensors. Some conventional beam steerers use mechanical movement to steer a beam, while others use non-mechanical techniques, such as using liquid crystals and optical phased arrays. However, conventional mechanical and non-mechanical beam steering techniques continue to have limitations, for example in cost, complexity, device size and performance. In some fields of application, such as in automotive lidar applications, mechanical beam steering techniques, such as MEMS-based techniques, can be sensitive to vibration. There is, therefore, an ongoing need to provide improved techniques of light beam steering.

SUMMARY

In one embodiment according to the present disclosure, there is provided a light beam steerer device. The device includes a first conductive electrode, an electro-optical material and a second conductive electrode. The first conductive electrode and the second conductive electrode are mounted relative to the electro-optical material to induce an electric field within the electro-optical material in response to a voltage applied between the first conductive electrode and the second conductive electrode. The first conductive electrode and the second conductive electrode are further mounted relative to the electro-optical material so that an electric field distribution of the electric field induced within the electro-optical material in response to the voltage applied between the first conductive electrode and the second conductive electrode is non-uniform along an optical path along which a light beam travels through the electro-optical material.

In further, related embodiments, the first conductive electrode, the electro-optical material and the second conductive electrode may be all transparent to light in at least a shared portion of a light spectral range, and the electro-optical material may be mounted in an optical series path between the first conductive electrode and the second conductive electrode. The electro-optical material may include lead magnesium niobate-lead titanate; and may include at least one of: lead magnesium niobate-lead titanate, a poly(vinylidene fluoride-trifluoroethylene) copolymer, lithium niobate, barium titanate, strontium barium niobate, potassium dihydrogen phosphate, lead lanthanum zirconate titanate, gallium arsenide and lead zirconate niobate-lead titanate. At least one of the first conductive electrode and the second conductive electrode may include at least one material including at least one of: indium tin oxide, zinc oxide, gallium oxide, indium-doped cadmium-oxide, barium stannate and strontium vanadate, calcium vanadate.

In other related embodiments, the electro-optical material may include a planar layer. The first conductive electrode may include a first layer deposited on a first side of the electro-optical material, and the second conductive electrode may include a second layer deposited on a second side of the electro-optical material, the first side being opposite to the second side. The first conductive electrode may include a layer of a first material, and the first conductive electrode may be bounded on at least one edge by a first gap on a first side of the electro-optical material, the gap being between the first conductive electrode and another layer of the first material on the first side of the electro-optical material. The second conductive electrode may include a layer of a second material, and the second conductive electrode may be bounded on at least one edge by a second gap on a second side of the electro-optical material, the second side being opposite the first side, the second gap being between the second conductive electrode and another layer of the second material on the second side of the electro-optical material. The second material may be the same material as the first material. The first gap may include a first etched gap between the first conductive electrode and the other layer of the first material on the first side of the electro-optical material, and the second gap may include a second etched gap between the second conductive electrode and the other layer of the second material on the second side of the electro-optical material. The first gap and the second gap may be positioned so that the first conductive electrode and the second conductive electrode are offset from each other in at least one direction along a planar direction of the electro-optical material.

In further, related embodiments, the device may further include a third conductive electrode on the first side of the electro-optical material, and a fourth conductive electrode on the second side of the electro-optical material, wherein the first conductive electrode and the second conductive electrode are offset from each other in each of two perpendicular directions along the plane of the electro-optical material, and wherein the third conductive electrode and the fourth conductive electrode are also offset from each in the two perpendicular directions along the plane of the electro-optical material. The first conductive electrode and third conductive electrode each may be formed of the first material and each may be bounded by at least two etched gaps on the first side of the electro-optical material; and the second conductive electrode and the fourth conductive electrode each may be formed of the second material and each may be bounded by at least two etched gaps on the second side of the electro-optical material. The device may further include a voltage source connected between the first conductive electrode and the second conductive electrode.

In other related embodiments, the device may further include a third conductive electrode and a fourth conductive electrode, the third conductive electrode and the fourth conductive electrode being mounted relative to the electro-optical material to induce an electric field within the electro-optical material in response to a second voltage applied between the third conductive electrode and the fourth conductive electrode. The third conductive electrode and the fourth conductive electrode may be further mounted relative to the electro-optical material so that an electric field distribution of the electric field, induced within the electro-optical material in response to the voltage applied between the first conductive electrode and the second conductive electrode and in response to the second voltage applied between the third conductive electrode and the fourth conductive electrode, is non-uniform along an optical path along which a light beam travels through the electro-optical material. The device may further include a first voltage source connected between the first conductive electrode and the second conductive electrode, and a second voltage source connected between the third conductive electrode and the fourth conductive electrode. The first conductive electrode layer and the second conductive electrode layer may each include a thickness less than 1 micron. The electro-optical material may include a thickness less than 10 millimeters. The device may include a solid-state beam steerer. The device may transmit light through the electro-optical material, or through the electro-optical material and the first conductive electrode layer and the second conductive electrode layer, in a light spectral range that includes a range of light wavelengths between about 500 nm and about 7000 nm; or in a light spectral range that includes a range of light wavelengths within one or more of ultraviolet light wavelengths, visible light wavelengths and infrared light wavelengths.

In another embodiment according to the present disclosure, an optical system includes a light transmitter source positioned to transmit light through a light beam steerer device according to an embodiment of the present disclosure. The light transmitter source may include a laser light source of a lidar system. The optical system may further include a light detector positioned to receive light transmitted through the light beam steerer device. The light detector may include a light detector of a lidar system. The system may include at least a portion of a device selected from: a lidar system, a projection display, and a laser printer.

In another embodiment according to the present disclosure, there is provided a method of steering a light beam. The method includes applying a voltage between a first conductive electrode and a second conductive electrode, the first conductive electrode and the second conductive electrode being mounted relative to an electro-optical material so that the applying the voltage induces a non-uniform electric field within the electro-optical material; and transmitting the light beam through the electro-optical material while applying the voltage so that an output beam direction of the light beam from the electro-optical material differs from an input beam direction of the light beam into the electro-optical material.

In further, related embodiments, the method may include applying a second voltage between a third conductive electrode and a fourth conductive electrode, the third conductive electrode and the fourth conductive electrode being mounted relative to the electro-optical material so that the applying the second voltage induces a non-uniform electric field distribution within the electro-optical material; and transmitting the light beam through the electro-optical material while applying the second voltage so that an output beam direction of the light beam from the electro-optical material differs from the input beam direction of the light beam into the electro-optical material.

In another embodiment according to the present disclosure, there is provided a method of steering a light beam. The method includes applying a voltage between a first conductive electrode, the first conductive electrode being a part of a first transparent conductive device divided into a plurality of parts by one or more gaps, and a second conductive electrode, the second conductive electrode being a part of a second transparent conductive device divided into a plurality of parts by one or more gaps. The first transparent conductive device is formed on a first side of an electro-optical material comprising a planar layer including both sides, and the second transparent conductive device is formed on a second side of the electro-optical material. The first conductive electrode and the second conductive electrode are offset from each other in at least one direction along a planar direction of the electro-optical material, so that the applying the voltage induces a non-uniform electric field distribution within the electro-optical material. The method includes transmitting the light beam through the electro-optical material while applying the voltage so that an output beam direction of the light beam from the electro-optical material differs from an input beam direction of the light beam into the electro-optical material.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

In accordance with an embodiment of the present disclosure, there is provided a compact method for beam steering using a layer of transparent, electro-optical material, such as lead magnesium niobate-lead titanate (PMN-PT), sandwiched between two layers of conductive transparent oxides, such as indium tin oxide (ITO), zinc oxide (ZnO) or gallium oxide (GaO), which provides a voltage-controlled light beam steering system without any moving parts. The structure can be scaled by increasing the number of layers.

Figure 1:
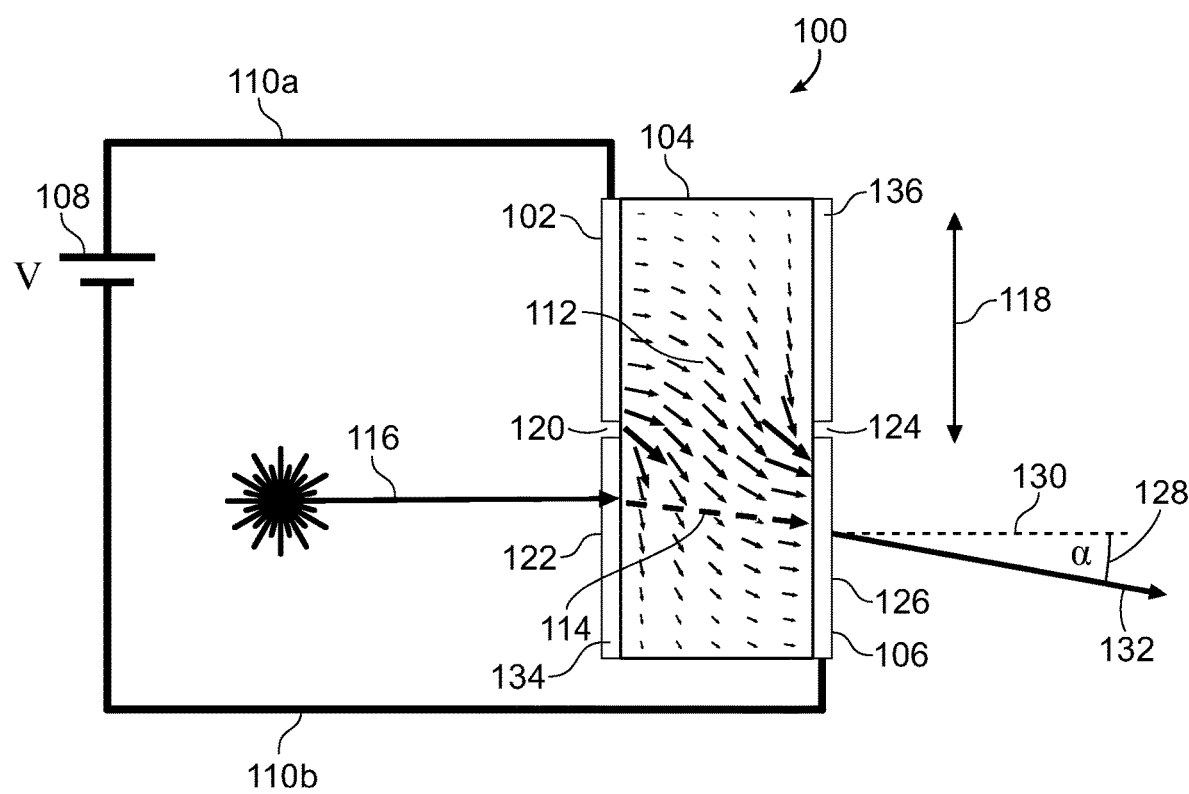
FIG. 1 is a schematic diagram of a light beam steerer device in accordance with an embodiment of the present disclosure.

FIG. 1 is a schematic diagram of a light beam steerer device 100 in accordance with an embodiment of the present disclosure. The device 100 includes a first conductive electrode 102, an electro-optical material 104 and a second conductive electrode 106. The first conductive electrode 102 and the second conductive electrode 106 are mounted relative to the electro-optical material 104 to induce an electric field within the electro-optical material 104 in response to a voltage applied between the first conductive electrode 102 and the second conductive electrode 106. For example, the first conductive electrode 102 and the second conductive electrode 106 can be deposited conductive layers on opposite surfaces of a layer of the electro-optical material 104, positioned across the electro-optical material 104 from each other so that an electric field is induced between them in response to a voltage applied to the first conductive electrode 102 and the second conductive electrode 106. The voltage can, for example, be a voltage, V, supplied by a voltage source 108 electrically connected to the first conductive electrode 102 and the second conductive electrode 106 by electrical connections 110a, 110b.

In addition, in the embodiment of FIG. 1, the first conductive electrode 102 and the second conductive electrode 106 are mounted relative to the electro-optical material 104 so that an electric field distribution 112 of the electric field induced within the electro-optical material 104 in response to the voltage applied between the first conductive electrode 102 and the second conductive electrode 104 is non-uniform along an optical path 114 along which a light beam 116 travels through the electro-optical material 104. It will be appreciated that, although electric field distribution 112 is shown schematically in FIG. 1, its actual form will vary depending on the arrangement of the electrodes 102, 106, the nature of the electro-optical material 104 and the voltage applied, and can, for example, be numerically determined by simulations. A non-uniformity in the electric field distribution 112 can, for example, be induced by offsetting the first conductive electrode 102 and the second conductive electrode 106 from each other in a planar direction 118 of the electro-optical material 104, that is, offsetting in a direction parallel to the electrodes 102, 106 on the surface of a planar layer of the electro-optical material 104. For example, a first gap 120 on a first side 122 of the electro-optical material 104 and a second gap 124 on a second side 126 of the electro-optical material 104 can be formed and aligned in the planar direction 118 so that the first conductive electrode 102 is offset from the second conductive electrode 106 in the planar direction 118. In this way, the electric field distribution 112 is non-uniform, which differs, for example, from an electric field distribution that would occur if the electrodes 102, 106 were positioned directly opposite each other on the opposite sides 122, 126 of the electro-optical material 104. As used herein, a "non-uniform electric field distribution" in a material is one in which the electric field intensity changes in the material. For example, relative to gap 120 in FIG. 1, a non-uniform electric field distribution is shown in FIG. 1 in which the electric field intensity decreases as one travels further from the center gap 120. Because the electro-optical material 104 changes its relative permittivity, and hence its index of refraction, depending on an electric field that is applied to it, the non-uniformity of the electric field distribution 112 creates a non-uniformity of the index of refraction of the electro-optical material 104 along the optical path 114 along which the light beam 116 travels within the electro-optical material 104. Therefore, because of the changing index of refraction induced by the electrodes 102 and 106 in response to the voltage applied between the electrodes 102, 106, a difference angle (a) 128, is created between a direction 130 of the incoming light beam 116 and a direction of the outgoing light beam 132. In this way, a voltage applied across the electrodes 102, 106 can be used to steer the light beam 116 as it passes through the device 100. Changing the voltage can change the angle, a, 128, through which the light beam 116 is steered, since the changing index of refraction induced within the electro-optical material 104 varies depending on the voltage applied to the electrodes 102 and 106.

In accordance with an embodiment of the present disclosure, the first conductive electrode 102, the electro-optical material 104 and the second conductive electrode 106 can be all transparent to light in at least a shared portion of a light spectral range, and the electro-optical material 104 can be mounted in an optical series path between the first conductive electrode 102 and the second conductive electrode 106. In this way, a light beam 116 can be transmitted in a path through all three of the first conductive electrode 102, the electro-optical material 104 and the second conductive electrode 106, in an optical series path. Alternatively, the electrodes 102 and 106 need not be transparent to the portion of the light spectral range of light beam 116 (for example by being made of non-transparent metal oxides), in which case light beam 116 could only be steered by passing through the electro-optical material 104 on a path that avoided having the light beam 116 be transmitted through the electrodes 102 and 106 (for example, through gaps 120 and 124). However, by making both electrodes 102 and 106 be transparent, in addition to electro-optical material 104, a wider range of transmission angles of the light beam 116 through the device 100 is made possible. In order to make the electrodes 102 and 106 transparent, the first conductive electrode 102 and the second conductive electrode 106 can be made of one or more transparent conductive oxides, and can be made of the same material or of different materials. For example, the first conductive electrode and the second conductive electrode can include at least one transparent conductive oxide material including at least one of: indium tin oxide, zinc oxide, gallium oxide, indium-doped cadmium-oxide, barium stannate and strontium vanadate, calcium vanadate. Depending on material properties, using different materials having different properties, such as refractive indices, for the electrodes 102 and 106 can increase the tilt angle 128; however, the same material may be used for the electrodes 102 and 106 on both sides of the electro-optical material 104. In addition to a tilt angle 128, there may also be a beam shift between the incoming light beam 116 and the outgoing light beam 132 in the planar direction 118, for example as can be seen in FIG. 1 by a vertical offset in the planar direction 118 between the direction line 130 and the incoming light beam 116. The first conductive electrode 102 and the second conductive electrode 106 can be layers, typically below 1 μm in thickness, and usually a few hundreds of nanometers thick, for example between about 100 nanometers and 500 nanometers in thickness, although it will be appreciated that other dimensions can be used. The first conductive electrode 102 and the second conductive electrode 106 can, for example, be deposited on the electro-optical material, such as by sputtering or electron beam physical vapor deposition (EBPVD) or any other suitable process.

As used herein, an "electro-optical material" is a material in which the optical properties of the material change based on an electric field applied to the material, for example, by undergoing a change in refractive index or birefringence based on the electric field applied to the material. A change in the optical properties of the electro-optical material, such as the birefringence of the electro-optical material can, for example, be linear or quadratic, or can vary in any other manner depending on the applied electric field. In one embodiment according to the present disclosure, the electro-optical material 104 includes lead magnesium niobate-lead titanate. The electro-optical material 104 can, for example, also include at least one of: lead magnesium niobate-lead titanate, a poly(vinylidene fluoride-trifluoroethylene) copolymer, lithium niobate, barium titanate, strontium barium niobate, potassium dihydrogen phosphate, lead lanthanum zirconate titanate, gallium arsenide and lead zirconate niobate-lead titanate. The electro-optical material can, for example, include a thickness that is typically thicker than that of the electrodes 102 and 106, such as from a few microns up to the millimeter range, for example, a thickness of less than 10 millimeters, or between 1 micron and 5 millimeters, or between 1 micron and 1 millimeter, or between 1 micron and 100 microns, although it will be appreciated that other thicknesses can be used. Because the beam tilt angle 128 is generally proportional to the thickness of the electro-optical material 104, a larger thickness of the electro-optical material 104 can be useful to produce a larger tilt angle 128, but if the material 104 were to be too thick there could be a limitation on the transparency of the device 100.

In accordance with an embodiment of the present disclosure, the device 100 can include a solid-state beam steerer, and can be without any moving parts. Where the electro-optical material 104 is lead magnesium niobate-lead titanate (PMN-PT), a wideband range of the light spectrum can be beam-steered using the device, since commercial PMN-PT materials transmit light over a wideband range, typically between about 500 nanometers and about 7000 nanometers.

The device 100 can, therefore, transmit light through the electro-optical material 104, or through all three of the electro-optical material 104 and the first conductive electrode layer 102 and the second conductive electrode layer 106, in a light spectral range that includes a range of light wavelengths between about 500 nm and about 7000 nm; or in a light spectral range that includes a range of light wavelengths within one or more of ultraviolet light wavelengths, visible light wavelengths and infrared light wavelengths.

As shown in the embodiment of FIG. 1, the electro-optical material 104 can include a planar layer—that is, a layer 104 in which the surfaces of both sides 122 and 126 are flat planes. Such a shape for the electro-optical material 104 facilitates manufacturing, so that, for example, the first conductive electrode 102 can be formed as a first layer deposited on a first side 122 of the electro-optical material 104, and the second conductive electrode 106 can include a second layer deposited on a second side 126 of the electro-optical material 104, opposite to the first side 122. In manufacturing, the layers can be deposited in any order, and sacrificial layers of other materials can be used to facilitate speed of manufacturing. The first conductive electrode 102 can include a layer of a first material, such as any of the transparent conductive oxides given herein. The first conductive electrode 102 can be bounded on at least one edge by the first gap 120 on the first side 122 of the electro-optical material 104, where the first gap 120 is between the first conductive electrode 102 and another layer 134 of the first material on the first side 122 of the electro-optical material 104. Likewise, the second conductive electrode 106 can include a layer of a second material, such as any of the transparent conductive oxides given herein (either the same as, or different from, the first material) and the second conductive electrode 106 can be bounded on at least one edge by the second gap 124 on the second side 126 of the electro-optical material 104, where the second gap 124 is between the second conductive electrode 106 and another layer 136 of the second material on the second side 126 of the electro-optical material. To form the first conductive electrode 102 and the second conductive electrode 106, a convenient manufacturing technique can include depositing a first material layer that includes both the material that will later be the first conductive electrode and the other layer 134 on the first side 122, and then etching the first gap 120 on the first side 122. Alternatively, where etching techniques are used herein, a scribing technique may be used. Likewise, a second material layer can be deposited on the second side 126, and be etched to form the second gap 124 between the second conductive electrode 106 and the other layer 136 on the second side 126. In this way, the first gap 120 can include a first etched gap between the first conductive electrode 102 and the other layer 134 of the first material on the first side 122 of the electro-optical material, and the second gap 124 can include a second etched gap 124 between the second conductive electrode 106 and the other layer 136 of the second material on the second side 126 of the electro-optical material. In other words, there are two conductive pads 102, 134 and 106, 136 on each side of the electro-optical material, only one of which (102 and 106) is connected to the voltage supply on each side. The first gap 120 and the second gap 124 can be positioned so that the first conductive electrode 102 and the second conductive electrode 106 are offset from each other in at least one direction 118 along the plane of the electro-optical material 104. For example, by etching the gaps 120 and 124 directly opposite each other, the first conductive electrode 102 can be formed to be offset from the second conductive electrode 106 in direction 118 along the plane of the electro-optical material 104. In another embodiment according to the present disclosure, only a single conductive electrode 102 and 106 can be used on each side.

Alternatively, in another embodiment according to the present disclosure, the electro-optical material 104 need not include a planar layer—for example, the surfaces of the sides 122 and 126 can be positioned at an angle to each other, while the positioning of the electrodes 102 and 106 produces a non-uniform electric field within the electro-optical material 104. In one example, an electrode 102 positioned on one side, and near the apex, of a triangular prism of electro-optical material 104 can be used opposite to an electrode 106 positioned on the opposite side, and near the base, of the triangular prism of electro-optical material 104. Such non-planar shapes for the electro-optical material 104 may, however, be more difficult to manufacture than a planar electro-optical material 104.

In use of an embodiment according to the present disclosure, with reference to the embodiment of FIG. 1, a method of steering a light beam 116 includes applying a voltage, V, between the first conductive electrode 102 and the second conductive electrode 106, where the first conductive electrode 102 and the second conductive electrode 106 are mounted relative to the electro-optical material 104 so that applying the voltage induces a non-uniform electric field 112 within the electro-optical material 104. The light beam 116 is transmitted through the electro-optical material 104 while applying the voltage, V, so that an output beam direction 132 of the light beam 116 from the electro-optical material 104 differs from an input beam direction 130 of the light beam 116 into the electro-optical material 104. The output angle difference 128 may not necessarily vary in a simple linear or quadratic fashion based on the applied voltage, V, but can be calculated numerically (through simulations) or analytically.

Figure 2:
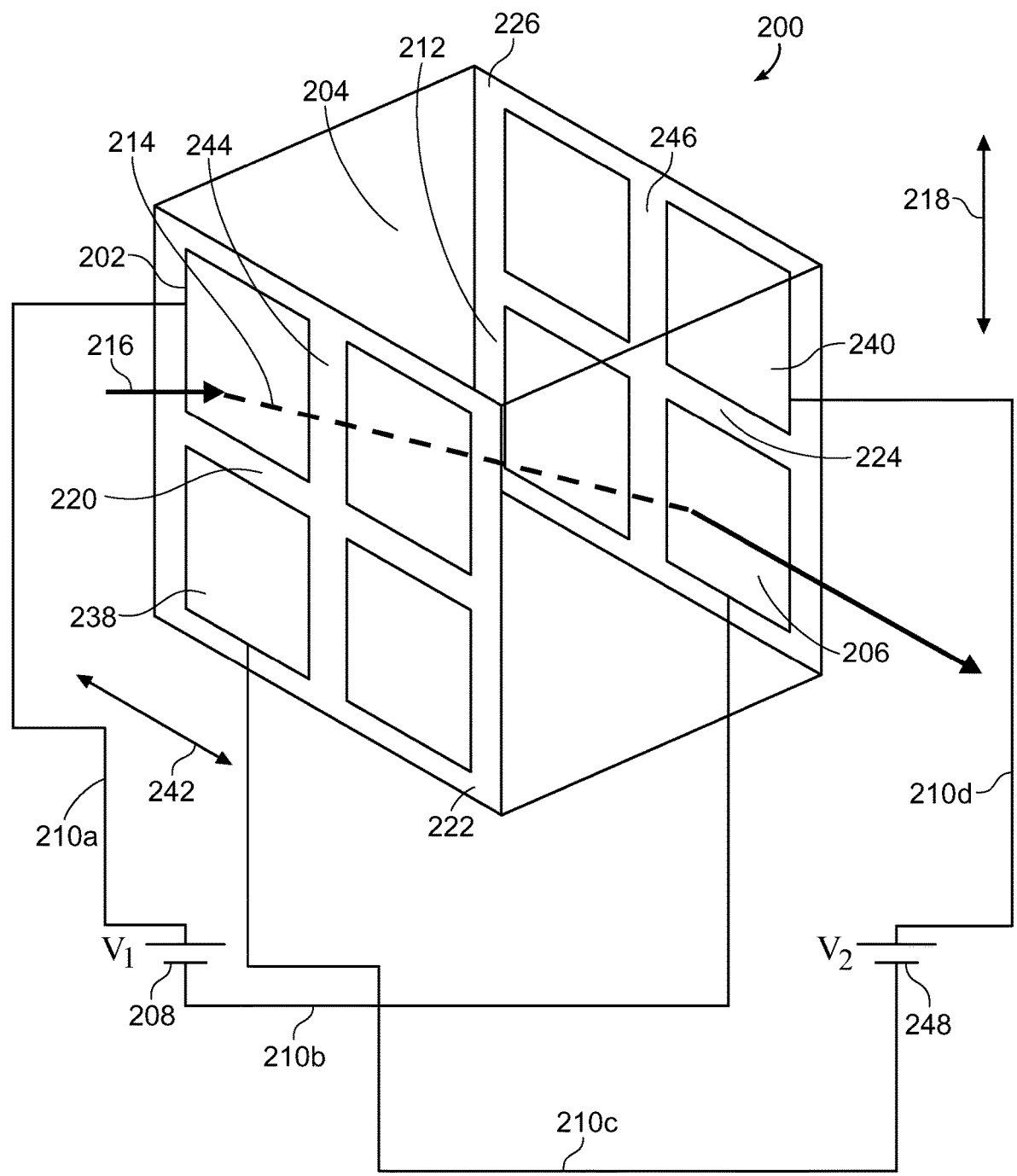
FIG. 2 is a schematic diagram of a light beam steerer device that can steer a beam two-dimensionally, in accordance with an embodiment of the present disclosure.

FIG. 2 is a schematic diagram of a light beam steerer device 200 that can steer a beam two-dimensionally, in accordance with an embodiment of the present disclosure. In the embodiment of FIG. 2, a total of four conductive electrodes 202, 206, 238, 240 are used, which are offset from each other in each of two perpendicular directions 218 and 242. The device includes a first conductive electrode 202 on a first side 222, a second conductive electrode 206 on a second side 226, a third conductive electrode 238 on the first side 222, and a fourth conductive electrode 240 on the second side 226 of the electro-optical material 204. The first conductive electrode 202 and the second conductive electrode 206 are offset from each other in each of two perpendicular directions 218 and 242 along the plane of the electro-optical material 204, and the third conductive electrode 238 and the fourth conductive electrode 240 are also offset from each in the two perpendicular directions 218 and 242 along the plane of the electro-optical material 204. The first electrode 202 and third electrode 238 each can be formed of the first material and each can be bounded by at least two etched gaps 220, 244 on the first side of the electro-optical material; and the second electrode 206 and the fourth electrode 240 each can be formed of the second material and each can be bounded by at least two etched gaps 224, 246 on the second side 226 of the electro-optical material 204. For example, the four electrodes 202, 206, 238 and 240 can be formed by initially forming eight transparent conductive oxide pads by forming two perpendicular grooves to form gaps 220, 224, 244, 246 in a layer of transparent conductive oxide on each side of the electro-optical layer 204, and then only using four (202, 206, 238 and 240) of the eight pads. The first conductive electrode 202 and the second conductive electrode 206 are mounted relative to the electro-optical material 204 to induce an electric field within the electro-optical material 204 in response to a first voltage, $V_1$, applied between the first conductive electrode 202 and the second conductive electrode 206, and the third conductive electrode 238 and the fourth conductive electrode 240 are mounted relative to the electro-optical material 204 to induce an electric field within the electro-optical material 204 in response to a second voltage, $V_2$, applied between the third conductive electrode 238 and the fourth conductive electrode 240. The third conductive electrode 238 and the fourth conductive electrode 240 are mounted relative to the electro-optical material 204 so that an electric field distribution (in an analogous fashion to electric field distribution 112 of FIG. 1) of the electric field, induced within the electro-optical material 204 in response to the voltage $V_1$, applied between the first conductive electrode 202 and the second conductive electrode 206 and in response to the second voltage, $V_2$, applied between the third conductive electrode 238 and the fourth conductive electrode 240, is non-uniform along an optical path 214 along which a light beam 216 travels through the electro-optical material 204. The device 200 includes a first voltage source 208 connected between the first conductive electrode layer 202 and the second conductive electrode layer 206, for example using electrical connections 210a and 210b, and a second voltage source 248 connected between the third conductive electrode 238 and the fourth conductive electrode 240 using electrical connections 210c and 210d. The two voltage sources 208 and 248 each drive one conductive electrode on each side, using a total of four conductive electrodes (202, 206, 238 and 240).

In accordance with an embodiment of the present disclosure, multiple light beam steerer devices 100 and/or 200 can be positioned optically in series with each other, for example in a stack of planar electro-optical and transparent conductive oxide layers in optical series, by repeating the devices 100 or 200 of FIGS. 1 and 2 in series. Multiple voltage sources can form connections with each of the transparent conductive oxide electrode along the stack, to steer the beam. This permits scaling of the device, which can increase a steering angle 128 of the light beam, as long as the total transmission of the stacked films is acceptable.

Figure 3:
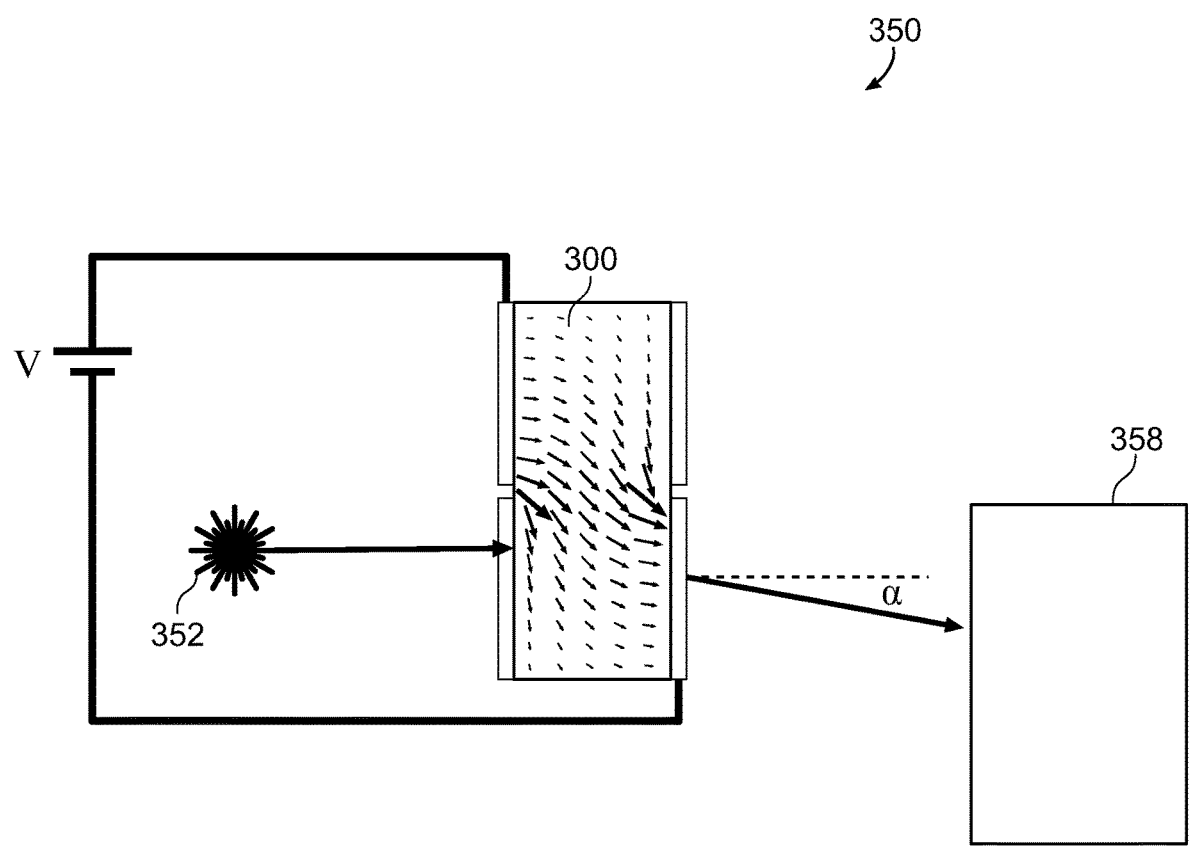
FIG. 3 is a schematic diagram showing a light beam steerer device in accordance with an embodiment of the present disclosure, used as part of an optical system.

FIG. 3 is a schematic block diagram showing a light beam steerer device 300 in accordance with an embodiment of the present disclosure, used as part of an optical system 350. As shown in FIG. 3, the optical system 350 can include a light transmitter source 352 positioned to transmit light through the device 300. The light transmitter source 352 can, for example, include a laser light source of a lidar system. The system 350 can further include a light detector 358 positioned to receive light transmitted through the device 300. The light detector 358 can, for example, include a light detector of lidar system. The system 350 may include at least a portion of a system selected from: a lidar system, a projection display, and a laser printer.

As used herein, a numerical quantity indicated as being "about" a given numerical value can, for example, be within about 10% of the given numerical value, such as within about 5% of the given numerical value, for example within about 1% of the given numerical value, or may be equal to the given numerical value.

While example embodiments have been particularly shown and described, it will be understood by those skilled in the art that various changes in form and details may be made therein without departing from the scope of the embodiments encompassed by the appended claims.

What is claimed is:

1. A method of steering a light beam, the method comprising:
    applying a voltage between a first conductive electrode and a second conductive electrode, the first conductive electrode and the second conductive electrode being mounted relative to an electro-optical material so that the applying the voltage induces a non-uniform electric field distribution within the electro-optical material;
    transmitting the light beam through the electro-optical material while applying the voltage so that an output beam direction of the light beam from the electro-optical material differs from an input beam direction of the light beam into the electro-optical material;
    applying a second voltage between a third conductive electrode and a fourth conductive electrode, the third conductive electrode and the fourth conductive electrode being mounted relative to the electro-optical material so that the applying the second voltage induces a non-uniform electric field distribution within the electro-optical material; and
    transmitting the light beam through the electro-optical material while applying the second voltage so that an output beam direction of the light beam from the electro-optical material differs from the input beam direction of the light beam into the electro-optical material.

2. The method of claim 1, wherein the first conductive electrode, the electro-optical material and the second conductive electrode are all transparent to light in at least a shared portion of a light spectral range;
    the electro-optical material being mounted in an optical series path between the first conductive electrode and the second conductive electrode.

3. The method of claim 1, wherein the electro-optical material comprises at least one of: lead magnesium niobate-lead titanate, a poly(vinylidene fluoride-trifluoroethylene) copolymer, lithium niobate, barium titanate, strontium barium niobate, potassium dihydrogen phosphate, lead lanthanum zirconate titanate, gallium arsenide and lead zirconate niobate-lead titanate.

4. The method of claim 3, wherein the electro-optical material comprises lead magnesium niobate-lead titanate.

5. The method of claim 1, wherein at least one of the first conductive electrode, the second conductive electrode, the third conductive electrode, and the fourth conductive electrode comprises at least one material comprising at least one of: indium tin oxide, zinc oxide, gallium oxide, indium-doped cadmium-oxide, barium stannate and strontium vanadate, calcium vanadate.

* * * * *